United States Patent [19]

Brüssel

[11] Patent Number: 4,954,068
[45] Date of Patent: Sep. 4, 1990

[54] HYDRAULIC PRESS

[75] Inventor: Richard Brüssel, Sulzfeld, Fed. Rep. of Germany

[73] Assignee: Fried. Krupp Gesellschaft mit beschränkter Haftung, Essen, Fed. Rep. of Germany

[21] Appl. No.: 303,350

[22] Filed: Jan. 30, 1989

[30] Foreign Application Priority Data

Jan. 30, 1988 [DE] Fed. Rep. of Germany ....... 3802761

[51] Int. Cl.⁵ .................. B29C 43/32; B30B 15/24
[52] U.S. Cl. ................... 425/406; 100/258 A; 100/269 R; 425/451; 425/DIG. 47
[58] Field of Search .............. 100/258 A, 259, 260, 100/269 R; 264/40.5, 40.7; 425/107, 406, 408, 450.1, 451, 451.2, 589, 590, DIG. 47

[56] References Cited

U.S. PATENT DOCUMENTS

| | | | |
|---|---|---|---|
| 2,809,543 | 10/1957 | Zeitlin | 100/258 A |
| 3,208,373 | 9/1965 | Bachelier | 425/408 |
| 3,587,138 | 6/1971 | Bammert | 425/589 |
| 3,716,323 | 2/1973 | Classen | 425/451.2 |
| 3,825,386 | 7/1974 | Bello et al. | 425/150 |
| 3,921,286 | 11/1975 | Petersen | 384/12 |
| 3,994,540 | 11/1976 | Petersen | 384/12 |
| 4,076,780 | 2/1978 | Ditto | 264/40.5 |
| 4,445,840 | 5/1984 | Kenmochi | 425/450.1 |
| 4,457,684 | 7/1984 | Gram | 425/451.9 |
| 4,759,280 | 7/1988 | Malashenko | 425/450.1 |

FOREIGN PATENT DOCUMENTS

| | | |
|---|---|---|
| 554810 | 7/1932 | Fed. Rep. of Germany . |
| 1136574 | 9/1962 | Fed. Rep. of Germany . |
| 3207242 | 9/1982 | Fed. Rep. of Germany . |
| 2128541 | 5/1984 | United Kingdom ............. 425/451.2 |

Primary Examiner—Jay H. Woo
Assistant Examiner—C. Scott Bushey
Attorney, Agent, or Firm—Spencer & Frank

[57] ABSTRACT

A hydraulic press has a generally horizontal press plate vertically movably supported in a press stand; a hydraulic press cylinder unit mounted in the press stand above the press plate and having a power cylinder and a piston rod longitudinally slidably received in the power cylinder and extending from the power cylinder to the press plate; and a hydrostatic floating bearing assembly arranged on a surface of the press plate. The lower terminus of the piston rod projects into a hydraulic chamber of the bearing assembly. The latter includes an annular body surrounding the piston rod terminus and being coaxial therewith; and a sealing ring positioned between the annular body and the surface of the press plate. The sealing ring sealingly engages the annular body and the press plate surface and has a working inner diameter which is smaller than the diameter of the lower terminus of the piston rod.

12 Claims, 2 Drawing Sheets

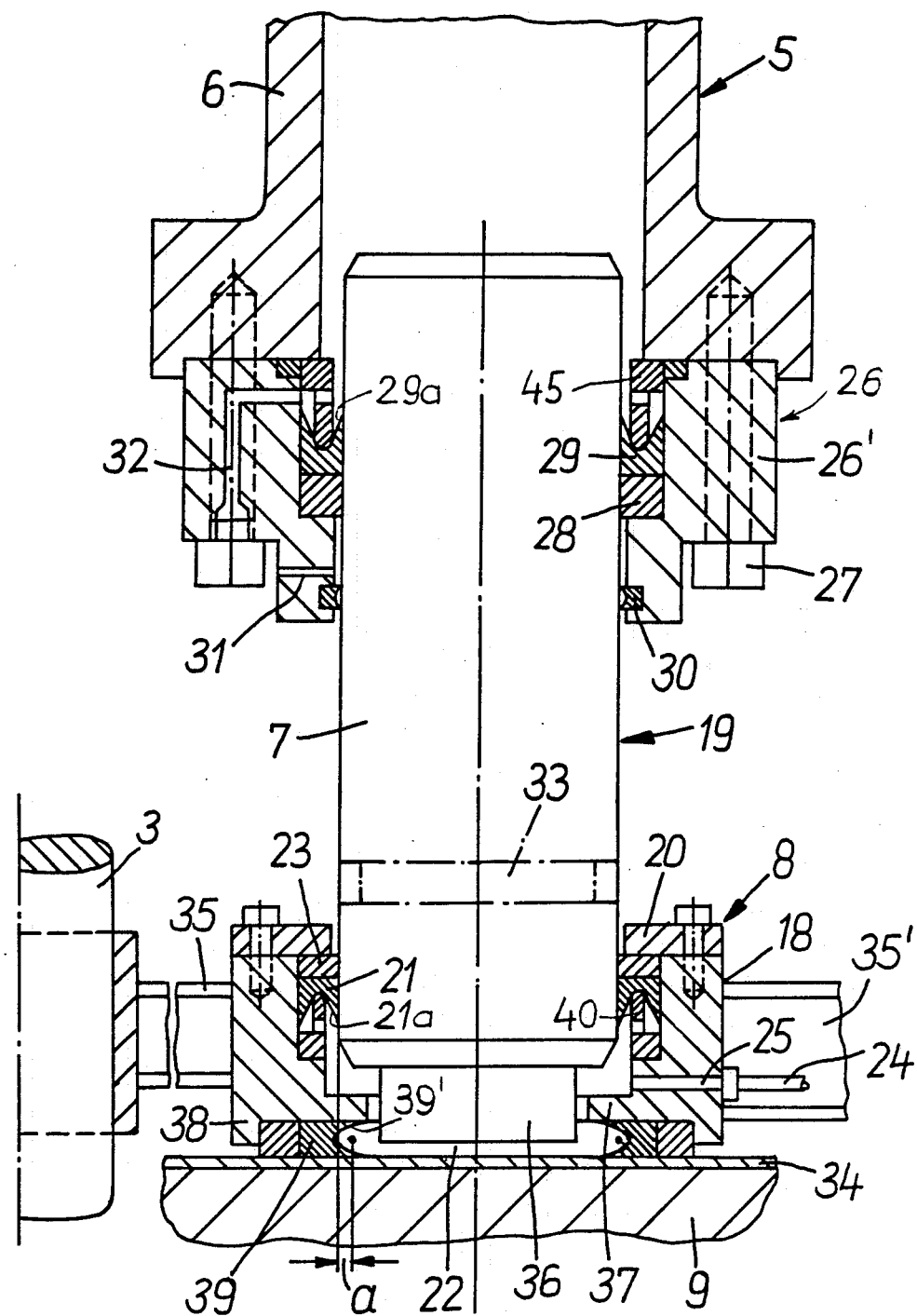

HYDRAULIC PRESS

BACKGROUND OF THE INVENTION

This invention relates to a hydraulic press particularly for the mold-pressing of fiber-reinforced synthetic materials. The hydraulic press is of the type in which the pressing force is applied to a press plate by at least one hydraulic press cylinder unit at a location where the cylinder unit is connected to the press plate. The press plate is guided laterally and may be braked by counter-support devices. The connection between the hydraulic press cylinder unit and the press plate is formed by a hydrostatic bearing element including an annular body which is partially filled with hydraulic fluid and which is provided with at least one inner annular sealing element. The end of the piston rod of the press cylinder unit extends into the annular body.

A hydraulic press of the above-outlined type is disclosed, for example, in U.S. Pat. No. 4,076,780. In such plastic molding presses the parallel run of the press plate is ensured by countersupport devices in the zone in which the pressing force becomes effective. The guidance of the press plate during the rapid-motion closing phase must center the press plate only to such an extent that a shock-free immersion of the tool guides into the countersupport devices is ensured. By virtue of the fact that the press plate, after contacting the countersupport devices, is normally engaged under conditions of static redundancy, ways have been sought to avoid such an occurrence. Thus, it is known to guide the press plate during the rapid closing with hydraulically positioned runner rollers on circular columns arranged on either side of the press plate and, after the penetration of the tool guides into the countersupport devices, to remove the forces applied to the runner rollers, that is, to render such a press plate guide ineffective. It is further known to couple the press cylinder unit with the press plate by spherical joints.

The known constructions, however, cannot provide for a desired free self-orientation (self-setting) of the press plate. Even a known spherical joint connection is to be regarded as a rigid coupling during the prevailing surface pressures.

In another known hydraulic press, disclosed in German patent document No. 3,207,242, which is a counter part of U.S. Pat. No. 4,457,684, a hydrostatic bearing is utilized for applying the press forces from below to a vertically movable press table. The hydrostatic bearing is formed on the top of the piston of the press cylinder unit and thus has no element into which a component of the press cylinder could penetrate. In this arrangement the sealing problems encountered at the parts which transmit pressing forces are very difficult to overcome, if at all possible.

Further, German patent document No. 1,136,574 discloses a device for transferring pressing forces in hydraulic presses into the movable transverse press head. In the center of the hydrostatic bearing, however, an additional bearing formed as a spherical shell is provided which locally delimits the hydrostatic bearing. Since the hydraulic fluid is admitted to the hydrostatic bearing from the hydraulic cylinder through an axially parallel bore provided in the piston, the piston has to be specifically prevented from being pushed out of the bowl-shaped bearing member. For this purpose a tension anchor is secured centrally to the terminus of the piston and the bearing body. It is a significant disadvantage of this arrangement that it is adapted only for a hydraulic press which is provided with a sole location where pressing forces are transferred from the force-generating unit. This is so because, in case of a simultaneous use of several such arrangements which exert a force parallel to the movable transverse head of the press, stresses are generated in case of oblique orientations of the transverse head as a result of distance variations of the axes of the associated components which in the normal state are aligned with one another.

SUMMARY OF THE INVENTION

It is an object of the invention to provide an improved hydraulic press of the above-outlined type in which the connection between the press cylinder unit and the press plate permits a relative motion which does not involve appreciable transverse or torque forces.

This object and others to become apparent as the specification progresses, are accomplished by the invention, according to which, briefly stated, the hydraulic press comprises a generally horizontal press plate vertically movably supported in a press stand; a hydraulic press cylinder unit mounted in the press stand above the press plate and having a power cylinder and a piston rod longitudinally slidably received in the power cylinder and extending from the power cylinder to the press plate; and a hydrostatic bearing assembly arranged on a surface of the press plate. The lower terminus of the piston rod projects into a hydraulic chamber of the bearing assembly. The latter includes an annular body surrounding the piston rod terminus and being coaxial therewith; and a sealing ring positioned between the annular body and the surface of the press plate. The sealing ring sealingly engages the annular body and the press plate surface and has a working inner diameter which is smaller than the diameter of the lower terminus of the piston rod.

The advantages achieved by the invention reside particularly in that despite the connection which is provided between the press cylinder unit and the press plate and which is practically free from transverse and torque forces, the required application of large normal forces to the press plate is not adversely affected.

The invention is particularly adapted for use in presses in which the press cylinder units are arranged above the press plate and project into upwardly open apertures of the press plate. The invention, however, may be advantageously utilized in other press force transmission systems without difficulty by means of appropriate force-transmitting constructions.

BRIEF DESCRIPTION OF THE DRAWING

FIG. 2 is a partially sectional elevational view of another preferred embodiment of the invention.

DESCRIPTION OF THE PREFERRED EMBODIMENTS

Figure 1:
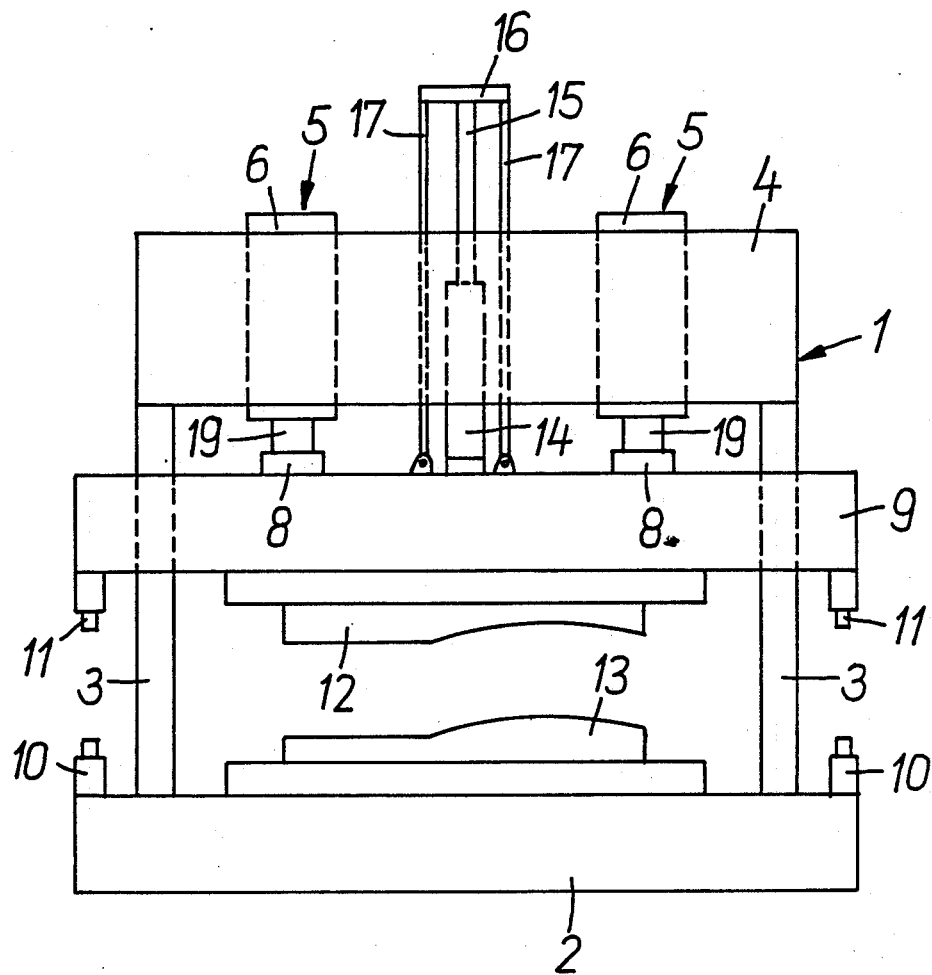
FIG. 1 is a schematic side elevational view of a hydraulic press incorporating a first preferred embodiment of the invention.

Turning to FIG. 1, there is illustrated therein a hydraulic press which comprises a frame-like stand 1 formed of a press table 2, two laterally arranged columns 3 situated adjacent the lateral edges of the press table 2 and a transverse head 4 connecting the two columns 3 with one another at the top.

In the transverse head 4 there are arranged two press cylinder units 5 each having a hydraulic power cylinder 6 arranged symmetrically relative to the two vertical central planes of the press. Each cylinder unit 5 has a piston rod 19 which is slidably received in the power cylinder 6 and which projects into a respective hydrostatic bearing assembly 8 mounted on the top of a press plate 9 guided at opposite lateral ends by the two columns 3. The guidance of the press plate 9 on the columns 3 is effected by non-illustrated, hydraulically pressable runner rollers of conventional construction. At opposite lateral ends of the press table 2 there are arranged pairs of hydraulic cylinders 10 which serve as countersupport devices, each cooperating with a respective, height-adjustable threaded spindle 11 mounted on the press plate 9. The press plate 9 and the press table 2 carry the upper and lower part 12 and 13, respectively, of the pressing tool (mold). Since the press cylinder units 5 transfer only pressure forces to the press plate 9, a return cylinder 14 centrally arranged with respect to the press and mounted on the transverse head 4 serves to perform a lifting stroke to raise the press plate 9 into its starting position. For this purpose, the upwardly retractable piston rod 15 of the return cylinder 14 engages via a transverse beam 16 two pull rods 17 which are anchored on the top face of the press plate 9.

FIG. 2 illustrates one of the piston rods 19 and the associated sealing and supporting mechanism to be now described in greater detail.

The hydrostatic floating bearing assembly 8 has an annular or body 18 loosely placed on the upper face of the press plate 9. The piston rod 19 which is constituted by a plunger 7 and which forms part of the press cylinder unit 5, has a stepped, cylindrical terminal portion 36 which extends into the annular body 18. At the upper face of the ring body 18 oriented away from the press plate 9 a radially inwardly extending flange 20 is provided which serves for supporting an annular sealing element 21. The flange 20 is secured by removable screws to the upper radial face of the ring body 18. Between the terminal portion 36 and the upper face of the press plate 9 a closed chamber 22 is formed which is filled with hydraulic fluid and by means of which a hydrostatic force transmission from the press cylinder unit 5 to the press plate 9 is effected. Between the sealing element 21 and the flange 20 there is arranged an annular guide element 23 which constitutes the sole guide between the plunger 7 and the ring body 18. By virtue of this arrangement advantageously a very short engagement length is obtained which permits relative tilting displacements between the plunger 7 and the guide element 23. The sealing element 21 has a downwardly oriented annular groove 21a, whose bottom is engaged by the upper circular edge of a support sleeve 40, supported, in turn, on an inner shoulder of the ring body 18. A radial port 25 and associated nipple 24 are provided in the annular body 18 for replenishing the hydraulic fluid.

At the end of the cylinder 6 of the press cylinder unit 5 the plunger 7 is held in a guide assembly 26 whose annular sleeve-like body 26' is secured by screws 27 to the radial end of the cylinder 6. The guide assembly 26 comprises a guide element proper which is formed of an elastic (for example, plastic) guide ring 28 of short axial length. The guide ring 28 is axially adjoined on the side of the cylinder 6 by a sealing ring 29 which is provided with a circumferential groove 29a in its radial face oriented towards the cylinder unit 5. The bottom of the groove 29a is engaged by the lower circular edge of a support sleeve 45, supported, in turn, on the outer radial edge face of the cylinder 6. At the outer end of the annular guide body 26' there is provided a sealing ring 30 serving as an oil stripper, and between the sealing ring 30 and the guide ring 28 a leakage port 31 is provided in the guide body 26' for the hydraulic fluid that has passed through the seals 28 and 29 from the press cylinder unit 5.

The guide ring 28 ensures a short axial engagement with the plunger 7 so that in cooperation with the guide element 23 an occasionally unavoidable "oblique positioning" of the plunger 7 under elimination of stresses is ensured.

The described embodiment has further the advantage that in the cylinder 6 of the press cylinder unit 5 no additional components exposed to wear are present which otherwise are required for the piston of a hydraulic cylinder unit. Combining the sealing components in the guide assembly 26 ensures an economic manufacture of the cylinder part 6.

As may be further observed in FIG. 2, the loosely positioned annular body 18 of the hydrostatic bearing assembly 8 is guided with an appropriate clearance on the surface of the press plate 9 in such a manner by a holder 35 which surrounds the associated column 3 that the annular body 18 follows the motions of the press plate 9. The surface of the press plate 9 in that zone is formed by a polished steel sheet 34. To ensure unison motions of the illustrated annular body 18 with an adjacent, non-illustrated annular body of another press cylinder 5, the two annular bodies 18 are coupled to one another by a yoke 35'. The non-illustrated annular body is guided by a holder in the same manner as the described annular body 18. Play fits may also be provided between the annular bodies and the holders 35 and the yoke 35'.

The cylindrical extension 36 of that end of the plunger 7 which extends into the annular body 18 is entirely surrounded by hydraulic fluid contained in the chamber 22. In the middle zone of the axial length of the extension 36 the annular body 18 has a radially inwardly extending annular flange 37 whose inner diameter is greater than the diameter of the extension 36 and smaller than the diameter of the plunger 7. Also at the lower end of the annular body 18 at its external perimeter there is formed an axially downwardly projecting annular skirt 38 having an inner cylindrical face engaged by an annular sealing element 39 having a circumferential groove 39' on its inner cylindrical face.

By virtue of the above-described construction, there is obtained, relative to the surface of the press plate 9, a floating bearing in which, by virtue of appropriately selected dimensions, a complete sealing is achieved. A sufficient pressing of the annular body 18 against the press plate 9 is achieved by providing that the effective diameter (working diameter) of the sealing element 39 is slightly less than the diameter of the plunger 7 or the piston rod 19 not designed as a plunger. The effective diameter is, in case of the horizontally arranged groove 39' of the sealing element 39, approximately—as known—in the mid zone of the groove, as indicated at a. Although in this manner a sealing of the chamber 22 is ensured, the proportion of the pressing force which is transferred by the seal 39 to the press plate 9 is but a fraction of the entire pressing force of the press cylinders. Thus, in case of a relative shift between the press plate 9 and the plunger 7, only relatively small forces transverse to the pressing force are generated, permitting a shift of the press plate 9 and securely avoid any stresses thereon.

In an embodiment having a "rigidly" guided piston rod 19 of the press cylinder 5, a guide on the column 3 may be dispensed with as shown in FIG. 1. This arrangement then results in a hydrostatic shuttle and slide shoe bearing which is adapted for relatively small tilting angles and relatively large lateral shifts. For such a case, where furthermore as a press cylinder a dual acting hydraulic cylinder is being used which performs both the downwardly oriented work stroke as well as the upwardly oriented return stroke, a corresponding groove as indicated in phantom lines at 33 in the piston rod 19 may be provided (as shown in FIG. 2). Groove 33 may serve for receiving a holder element which is coupled to the press plate 9 which, even during a rapid downward stroke is always brought to an engagement when the seal between the annular body 18 and the piston rod 19 becomes defective. In a normal case, upon such an occurrence, the piston rod 19 is entrained by the generated suction effect. This also applies in case of a plunger design as shown in FIG. 2. The annular groove 33 may further serve for supporting the plunger 7 or the piston rod 19 during the replacement of the sealing element 21 and the guide element 23 as well as may serve as a reference location of a sensor.

It will be understood that the above description of the present invention is susceptible to various modifications, changes and adaptations, and the same are intended to be comprehended within the meaning and range of equivalents of the appended claims.

What is claimed is:

1. A hydraulic press comprising
   (a) a press stand;
   (b) a generally horizontal press plate vertically movably supported in the press stand and arranged for executing forward and return strokes;
   (c) a hydraulic press cylinder unit mounted in said press stand above the press plate and having
      (1) a power cylinder having an end oriented towards said press plate; and
      (2) a piston rod longitudinally slidably received in the power cylinder and extending from the power cylinder to said press plate; said piston rod having a lower terminus;
   (d) a hydrostatic floating bearing assembly being loosely placed on a surface of said press plate for allowing displacement of the bearing assembly relative to the press plate; said hydrostatic floating bearing assembly defining a chamber containing hydraulic fluid; said lower terminus of said piston rod projecting into said chamber; the hydrostatic floating bearing assembly constituting a force transmitting arrangement between the piston rod and said press plate; said hydrostatic floating bearing assembly comprising
      (1) an annular body surrounding said lower terminus of said piston rod and being coaxial therewith; said annular body being a sleeve-shaped component open at both axial ends; and
      (2) a sealing ring positioned between said annular body and said surface of said press plate and being generally coaxial with said piston rod; said sealing ring sealingly engaging said annular body and said surface and having a working inner diameter which is smaller than the diameter of said lower terminus of said piston rod.

2. A hydraulic press as defined in claim 1, wherein said lower terminus of said piston rod has a stepped axial terminal extension of lesser diameter than the diameter of said piston rod; further wherein said annular body has a radially inwardly projecting annular flange situated at a distance from said surface of said press plate; said annular flange surrounding said axial terminal extension of said piston rod.

3. A hydraulic press as defined in claim 1, wherein said annular body has a radial end face oriented away from said surface of said press plate; said annular body has, at said radial end face, a radially inwardly projecting annular flange; further comprising an additional sealing ring situated inside said annular body and being generally coaxial therewith; said additional sealing ring being in engagement with said annular flange.

4. A hydraulic press as defined in claim 1, further comprising guide columns secured to said press stand and arranged for guiding said press plate during execution of said strokes; and connecting means for coupling said annular body to at least one of said guide columns for being guided thereby.

5. A hydraulic press as defined in claim 1, wherein there are provided a plurality of hydraulic press cylinder units each being associated with a separate said hydrostatic floating bearing assembly; further comprising coupling means for interconnecting the annular bodies of at least two hydrostatic floating bearing assemblies.

6. A hydraulic press as defined in claim 1, further comprising a radial port in said annular body for charging said chamber with hydraulic fluid.

7. A hydraulic press as defined in claim 1, further comprising an annular circumferential groove in said piston rod adjacent said lower terminus; said annular circumferential groove being situated externally of the hydrostatic floating bearing assembly.

8. A hydraulic press as defined in claim 1, wherein said piston rod is a plunger; further comprising means mounted at said end of said power cylinder for sealingly and tiltably guiding the plunger at said end of said power cylinder.

9. A hydraulic press as defined in claim 8, wherein said means mounted at said end of said power cylinder comprises
   (a) a cylindrical sleeve secured to said end of said power cylinder in axial alignment therewith;
   (b) a guide ring held within said cylindrical sleeve coaxially therewith; said guide ring being in engagement with said plunger and being arranged for allowing tilting motions thereof; and
   (c) first and second sealing rings held within said cylindrical sleeve coaxially therewith and flanking said guide ring.

10. A hydraulic press as defined in claim 9, wherein said end of said power cylinder includes a radial end face; further comprising means for mounting said cylindrical sleeve on said radial end face.

11. A hydraulic press as defined in claim 9, wherein said guide ring has a sufficiently small axial length for permitting said tilting motions.

12. A hydraulic press as defined in claim 9, wherein said guide ring is a resilient plastic for permitting said tilting motions.

* * * * *